(12) United States Patent
St. Germain

(10) Patent No.: US 6,224,064 B1
(45) Date of Patent: May 1, 2001

(54) CANTERING SPRING LOADED FIXED BASE BUTTERFLY VALVE SEAL

(75) Inventor: Stephen V. St. Germain, 422 Jerusalem Rd., Windham, CT (US) 06280

(73) Assignee: Stephen V. St. Germain, Windham, CT (US)

( * ) Notice: Subject to any disclaimer, the term of this patent is extended or adjusted under 35 U.S.C. 154(b) by 0 days.

(21) Appl. No.: 08/786,239

(22) Filed: Jan. 21, 1997

(51) Int. Cl.⁷ .............................. F16J 15/02; F16K 1/226
(52) U.S. Cl. ................ 277/589; 277/641; 277/643; 277/644; 251/306
(58) Field of Search ........................ 277/641, 642, 277/643, 589, 650, 644; 251/306; 267/153, 141

(56) References Cited

U.S. PATENT DOCUMENTS

| | | | |
|---|---|---|---|
| 3,654,950 | * | 4/1972 | Hamm ............................. 277/643 X |
| 3,718,338 | * | 2/1973 | Traub ............................. 277/589 X |
| 4,513,765 | * | 4/1985 | Rishovd et al. ................ 251/306 X |

FOREIGN PATENT DOCUMENTS

| | | | |
|---|---|---|---|
| 2605189 | * | 8/1976 | (DE) ............................. 251/306 |
| 2031124 | * | 4/1980 | (GB) ............................. 251/306 |
| 2121513 | * | 12/1983 | (GB) ............................. 251/306 |
| 0157867 | * | 9/1982 | (JP) ............................. 251/306 |

* cited by examiner

Primary Examiner—Chuck Y. Mah
Assistant Examiner—William Ackerman

(57) ABSTRACT

A seal for use in spherical disc type butterfly valves. The seal is T-shaped on the inside diameter region where contact is made with the disc and is cupped on radially opposite sides by contoured lips on the seal retainer ring and valve body such that the seal cannot be deformed by pressure by being pressed radially outwardly but rather is cupped by lips of retainer and valve body. The seal also has a rectangularly shaped region on the outside diameter for press fitting into the valve body. The seal has a groove containing a compressed spring element. The seal allows slight twisting motion about the fixed base region and radially toward the compressed spring element such that the seal can move axially with the disc under pressure to maintain uniform sealing contact with the disc without the seal becoming damaged.

1 Claim, 3 Drawing Sheets

17-VALVE STEM
18-VALVE STEM BUSHINGS

SEAL DETAIL

CANTERING SPRING LOADED FIXED BASE BUTTERFLY VALVE SEAL

BACKGROUND—FIELD OF INVENTION

This invention relates to seal designs used in butterfly valves.

BACKGROUND—DESCRIPTION OF PRIOR ART

Many butterfly valve designs have been implemented which incorporate the basic attribute of a disc which has an outside contour of a section of a sphere which imposes a compressive deformation on a surrounding plastic or elastomeric ring shaped seat when it closes in order to effect the seal. Unfortunately, all such designs are subject to loss of valve seal during use due to seat wear occurring during repetitive open to close cycling and/or due to compressive set of the seat which can be caused by material compressive and or hoop tension creep, seat contraction or expansion and concurrent material softening or hardening due to temperature changes, disc movement during high pressure application and/or disc/seat misalignment. These conditions will cause loss of seat sealing force which will limit the valve life and operating conditions. The disclosed FIG. 1 design is intended to greatly remedy these problems. To explain the benefits of the disclosed invention, a detailed description of how the various modes of operation of a spherical disc butterfly valve can lead to seal damage is provided. Before this detailed description is provided, a brief description of the disclosed FIG. 1 design is given.

OBJECTS AND ADVANTAGES

Figure 1:
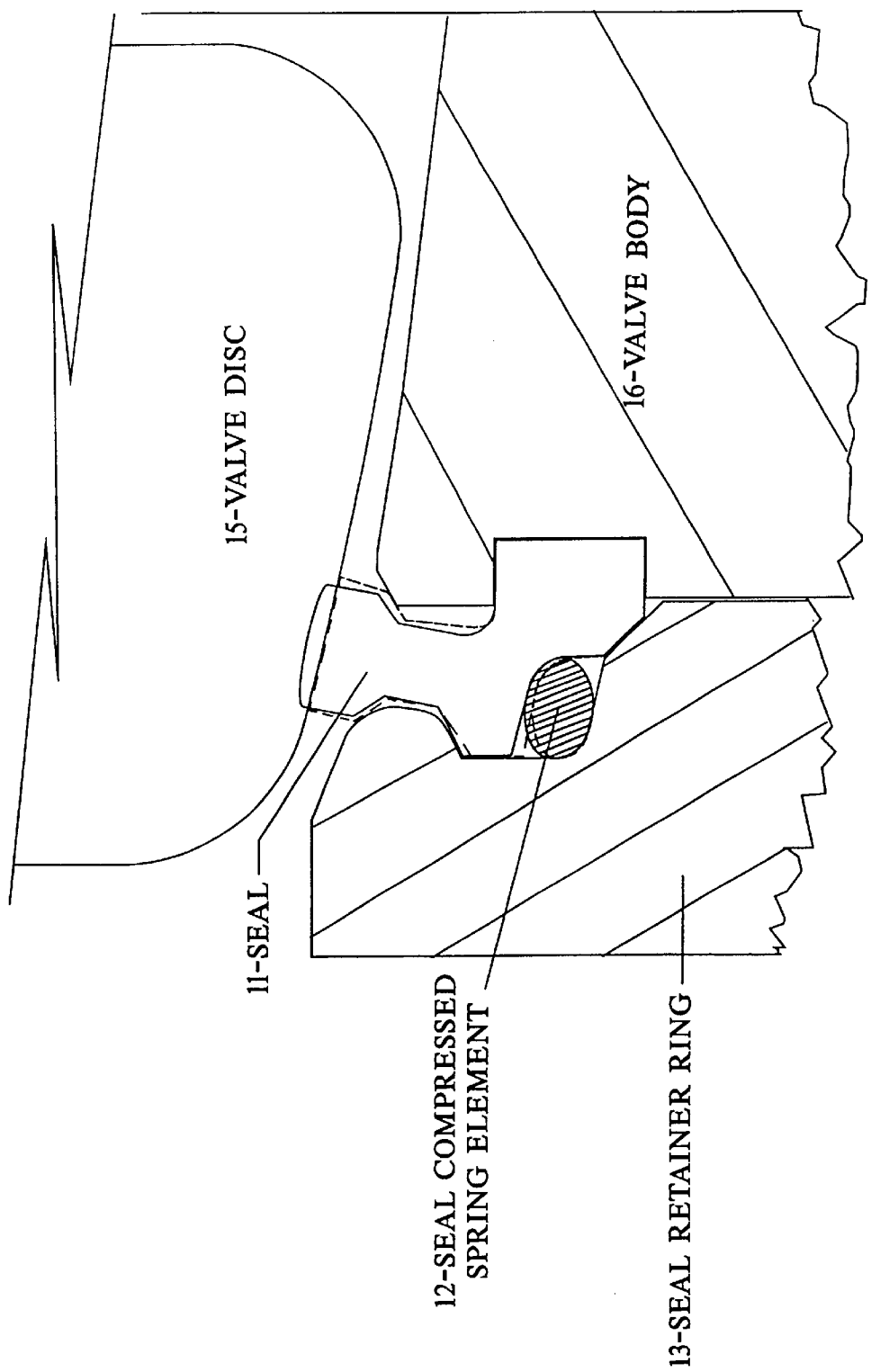
Figure 6:
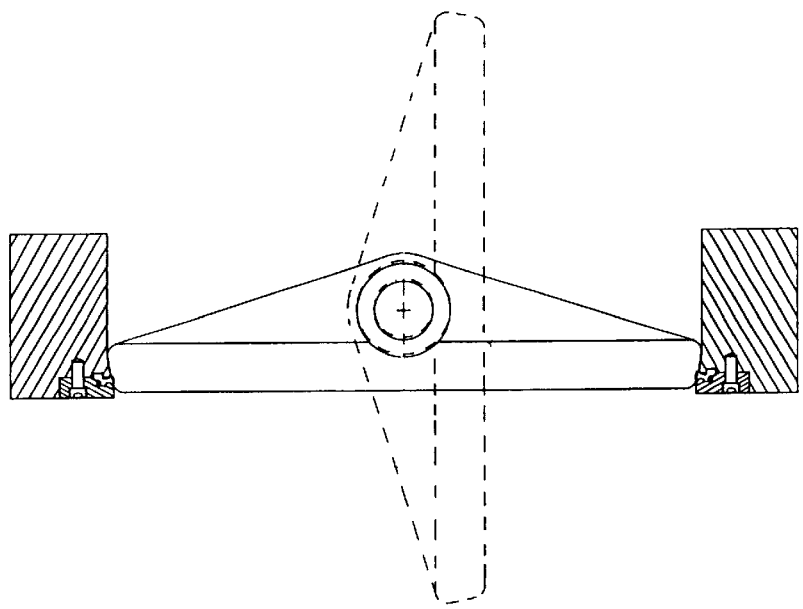
Figure 5:
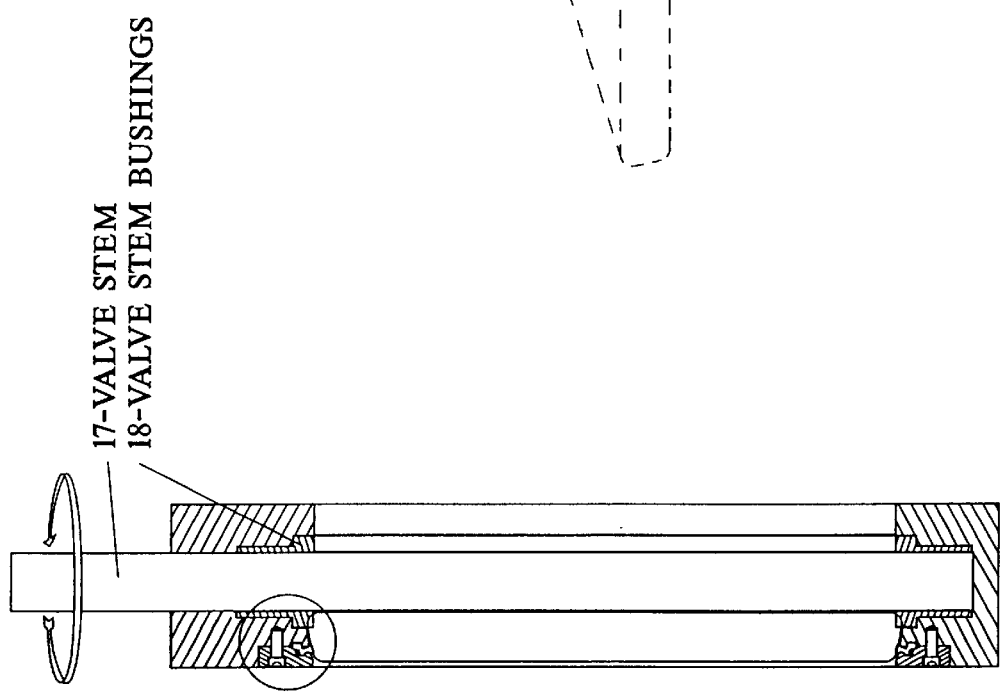
Figure 4:
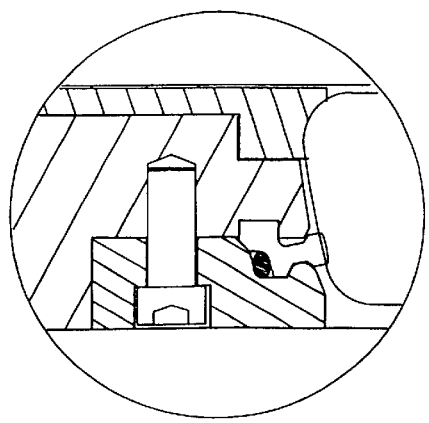

The subject butterfly valve seal as shown in FIG. 1 is designed for use on a butterfly valve with a spherical disc as shown in FIGS. 4 through 6 or other suitable valve. This seal 11 has several advantages over the other currently used seal designs for this type of valve.

The FIG. 1 seal 11 is unique in that it combines the features of a fixed side of the seal base on the valve preferred side with a cavity on the other side of the base which contains a resilient, compressed spring or bushing 12.

The compressed region of the base of the seal 11 provides secure restraint of the seal 11 in the valve body. Also, the seal 11 has a lip above the groove on the side opposite the fixed region which is cupped by a lip on the retainer 13. Together, the lip and fixed region of the seal 11 provide secure restraint of the seal 11 such that it will not dislodge due to flow impingement in either direction or extrude into the gap between the disc 15 and the valve when the disc 15 is not full closed but accumulating pressure such that the seal 11 would otherwise extrude into the gap between the disc 15 and the valve body 16.

Moreover, and uniquely beneficial, the seal design provides a fixed portion about which the remainder of the ring shaped seal 11 can cantilever flex in a toroidal manner. The toroidal flexure is resisted by the bushing or spring mechanism 12 contained in the cavity on the opposite side of the base of the seat 11. The combined resistance to toroidal flexure is thereby achieved by a combination of cantilevering of the seal 11 about its fixed base region and the simultaneous radial force developed by the compressed and/or dilated bushing or spring 12 which is contained in the radially expanding and/or sectionally decreasing cavity region upon disc 15 closure. This combination of a fixed region of the seat 11 base adjacent to a cavity region containing a spring or bushing 12 which is compressed and/or expanded in diameter due to flexure of the seat 11 about the opposite fixed region of the seat base is the essential claim herein. In addition to this claim, several attributes of the design have been arrived at which enable the arrangement to be installed easily, to be secured in the valve firmly, to enable it to work properly are part of the subject invention. The design provides a cavity feature which would facilitate secure and easy installation of the seal 11 while effecting spring/bushing 12 pre-compression in the cavity.

DRAWING FIGURES

FIGS. 1 shows a sectional detail of a typical embodiment of the disclosed valve seal 11, compressed spring 12, seal retainer 13, body 16 and disc 15 assembly. The seal is shown superimposed on the disc 15 to illustrate the amount of its interference with the disc when the disc is closed.

Figure 2:
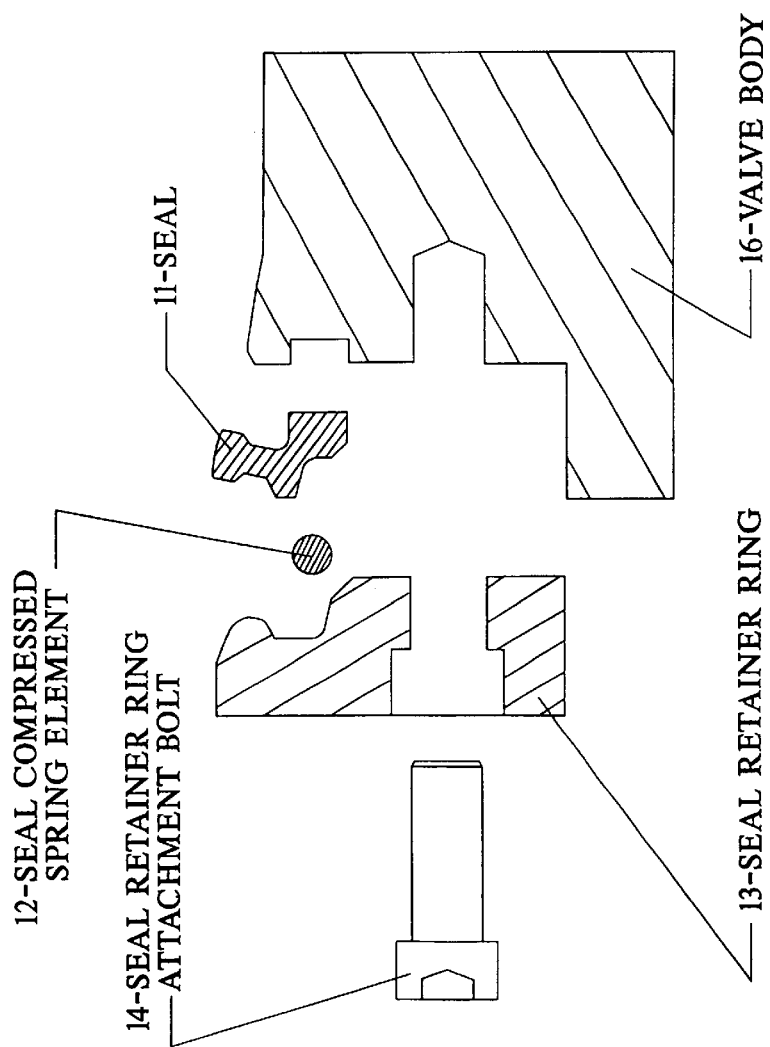

FIG. 2 shows an exploded sectional view of the FIG. 1 seal 11, seal compressed spring element 12, seal retainer ring 13 and valve body 16 and also of the seal retainer ring bolt 14 to illustrate how a seal of this type would be installed.

Figure 3:
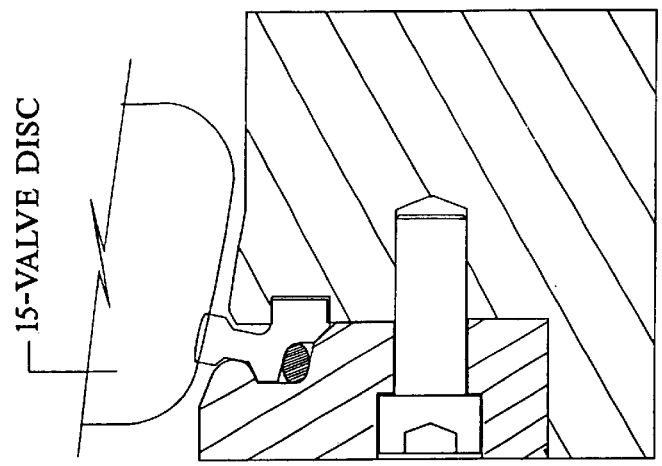

FIG. 3 shows the as assembled parts of FIG. 2 and the valve disc 15 superimposed on the seal 11 in its uncompressed shape to illustrate how the seal 11 will function.

FIG. 4 shows the FIG. 3 detail expanded to show its location in a typical butterfly valve as shown in FIGS. 5 and 6.

FIG. 5 shows the FIGS. 1 through 4 type seal 11 installed in a vertical sectional view of a typical butterfly valve to illustrate its overall installation and function in such a valve. The stem 17 rotation direction to open is shown by an arrow to illustrate the fashion of rotation of the stem when valve is opened.

FIG. 6 shows the FIGS. 1 through 4 type seal 11 as installed in a plan sectional view of a typical butterfly valve to illustrate its overall installation and function in such a valve. The disc 15 open position is shown in phantom in this Figure to illustrate the disc open position.

REFERENCE NUMERALS IN DRAWINGS

| | | | |
|---|---|---|---|
| 11 | seal | 12 | seal compressed spring element |
| 13 | seal retainer ring | 14 | seal retainer ring attachment bolt |
| 15 | valve disc | 16 | valve body |
| 17 | valve stem | 18 | valve stem supports |

DESCRIPTION—FIGS. 1 to 6

The FIG. 1 shows a currently designed embodiment of the subject seal invention. This design embodies all the unique and beneficial features of the subject seal invention.

The seal 11 is designed to be used in a spherical disc 15 type butterfly valve of the type shown in FIGS. 5 and 6. The valve in which it is intended to be used may or may not have an offset of the axis of rotation. The term preferred side is hereby defined as the side of the valve which when pressurized, causes the valve disc 15 to move toward the seal 11 causing it to expand further.

FIG. 1 shows the seal 11 in the installed, disc 15 open position and in the position in which it will be when deformed by closing of the disc 15 onto it. The seal 11 has an essentially rectangular region on the preferred side of the base which is press fit into a mating groove in the valve body 16 when installed. The opposite side of the valve seat 11 has a cavity which contains a spring or bushing 12 of some type which is slightly compressed in the cavity when the seal 11 is installed and prior to the disc 15 closing against the seal. When the disc 15 closes against the seal 11, the seal 11 is pushed radially outward and canters toward the non preferred side of the valve slightly. When the disc closes, the spring or bushing 12 in the groove in the base of the seal 11 is further elastically compressed. Thus, when the valve is assembled, the seal 11 is somewhat preloaded against the contained spring or bushing 12 such that when the disc 15 closes the seal 11 will exert a force against the disc 15 tending to assist the sealing force against it. The seal 11 has an inclined lip above the groove area which is designed to mate to a lip on the seat retainer ring 13 such that as the ring is being installed axially into the valve cavity against the seal 11, the seal 11 is toroidally drawn down onto the contained spring or bushing 12 acting to compress it. The lip on the seal 11 is designed such that during installation, at first contact with the retainer ring 13, the lip of the retainer ring 13 engages the end of the lip on the seal 11 and that further axial movement of the retainer ring 13 then draws the seal 11 into its final preloaded position. The seal 11 also has an inclined surface on the bottom non preferred side of the essentially rectangular base region which mates against a similarly inclined flat surface on the retainer 13 such that the retainer 13 acts to push the seal 11 rectangular region firmly into the groove in the valve body 16 when installed in its final position.

Consequently, the disclosed seal design provides a seal 11 which is easily and firmly fixed into the valve body 16 and which integrally contains a resilient spring or bushing 12 which provides resiliency to the seal assembly as a whole. As described in detail in the following operational description section, the spring 12 and seal 11 shape will cause it to be resistant to loosing sealing stress during undesirable modes of operation which would otherwise lessen its sealing force against the disc 15 causing leakage.

OPERATION—FIGS. 1 to 6

A typical embodiment of the subject seal invention is shown in FIG. 1. There are several functional attributes of the design which will enable it to perform better as a spherical disc butterfly valve seal as compared to currently used designs. These are explained in terms of the various operating modes of the valve as follows:

Mode 1: High pressure, preferred side. Disc 15 moves axially by small distance due to unavoidable flexibility of disc 15, stem 17 and stem supports 18 when it is pressurized to high pressure on the preferred side. The preferred side is the side of the valve disc 15 which when deflecting under pressure on that side, causes the disc 15 to wedge into the seal 11. Under this condition, the seal 11 will undergo the greatest amount of compression and/or hoop strain and plastic set. The FIG. 1 design provides greater ability for the seal 11 to twist and radially expand while exerting greater contact force against the disc 15 without taking a plastic hoop or compressive set such that it will have less tendency to loose sealing force in the event that the disc subsequently moves away from the seal when pressure is reduced or reversed and/or when subsequent temperature changes cause loss of sealing force due to seat thermal expansion or contraction and concurrent material stiffening or softening changes.

Mode 2: High pressure, non preferred side. Disc 15 moves axially by small distance in the non-preferred direction due to disc flexibility which tends to unseal seal 11 from disc 15 causing leakage. This situation is worsened if seal 11 has previously undergone plastic set due to the Mode 1 conditions or if it has lost contact force due the temperature change effects of material expansion or contraction and concurrent material stiffening or softening changes. Further, if the material is subsequently cooled, it can become stiff, and resistant to toroidal flexation such that it cannot twist to maintain contact with the disc 15 in the event that non preferred pressure forces the disc 15 away from it in the non preferred direction. Also, above situation worsened in any case if seal has undergone wear from being cycled open to close repetitively such that sealing force has been relaxed due to seat wear. Subject claim seat 11 toroidally flexes under bushing or spring 12 preload to maintain better contact with the valve disc 15 to remedy the above loss of compressive sealing force that the seal 11 exerts on the disc 15 that would otherwise occur during this mode of operation.

Mode 3: Low pressure on non preferred side. In this case, insufficient force may exist to force seal 11 into disc 15 to effect seal. This situation worsened if seal 11 has previously undergone plastic set due to Mode 1, and thermal material changes as described under mode 1 and 2. operation or if it looses sealing force due to changes in material stiffness and shape, and if seal 11 has abrasion wear due to cycling. This situation can also be worsened if seal 11 is stiff due to cold temperatures. Subject design will provide resiliency to maintain required normal seal force of seal 11 against disc 15.

The effect of temperature to cause the seal material to take a plastic set is difficult to predict. A given seal shape may contract or expand with increased temperature on the inside diameter depending on it's cross sectional shape and the manner in which its base is fixed to the valve body. Further, some materials will have greater tendency to take a plastic set when cold rather than when hot and vice-versa. Therefore, it cannot be generalized above what combinations of pressure and temperature conditions will cause a seal of the above type to experience the greatest loss of contact stress, but in any case, for any material, the disclosed seal 11 will maintain better sealing force having undergone any combination of the above described disadvantageous operational conditions.

An additional advantage of the subject invention is the unique retention method enabled by the shape of the seal 11 and the seal retainer 13. As shown in FIG. 1, the seal 11 has a large region on one side of the foot with square corners which fits into a groove in the valve body 16. The seal 11 is first installed into the groove in the valve body 16. The spring element 12 is then rested on the seal groove, and the retainer 13 is then installed. The retainer 13 has a lip on the upper side which engages an extended area above the groove in the seal 11 which causes the seal 11 to twist backward, compressing the contained spring mechanism 12 to a preloaded state. Consequently, when installed, the seal 11 is cupped on both sides such that it cannot dislodge, and such that the spring mechanism 12 is integrally contained in the cavity. When the valve is closed, the spring mechanism 12 is further compressed, exerting force on the seal 11. Consequently, when the valve is closed, the seal 11 will be compressed radially down onto the spring mechanism 12 contained in the groove it its foot such that the seal 11 will exhibit a strong tendency to maintain a compressive force against the disc 15 if the disc 15 undergoes movement away from the seal 11 due to pressure or if the seal 11 would otherwise loose contact stress due to changes in its shape and flexibility due to temperature changes.

SUMMARY, RAMIFICATIONS, AND SCOPE

Accordingly, the above described valve seal design will be uniquely advantageous for use in many current spherical disc butterfly valves since it will have comparatively better sealing performance over various disadvantageous operating conditions which could otherwise cause leakage. Further, the described seal design is amenable to expeditious design optimization in that a trial and error test approach can be used to establish which spring or bushing type is best suited for a particular seal provided that several springs or bushings of the same size but differing spring stiffnesses are available to try. Although the description above contains many specificities, these should not be construed as limiting the scope of the invention but as merely providing illustrations of some of the presently preferred embodiments of this invention. For example, the seal could find use in a flapper valve in which conically shaped disc moves entirely axially into it since the seal would be toroidally flexible. Also, for example, the compressed spring element could be constructed of some combination of metal and elastomer or plastic rather than a garter spring or compressed O-ring as described above provided that it served the same purpose in the seal groove. Thus the scope of the subject invention should be determined by the appended claims and their legal equivalents, rather than by the examples given.

I claim:

1. A valve seal for use on a spherical disc type butterfly valve comprises;

a plastic ring having an essentially rectangular region positioned on an axial side near an outside diameter which is adapted to be press-fitted into a mating groove in a valve body during installation; a groove on the axial side opposite to the rectangular region in which contains a radially resilient spring mechanism to provide radial resiliency to the valve seal; a lip radially inwardly positioned from the groove on the seal adapted to be cupped by a seal retainer ring as the seal is installed such that the seal is compressing the spring mechanism in said groove to establish an elastic compression which will act to force the seal against a valve disc to compensate for minor wear and to assist low pressure sealing force; an inclined flat surface on the groove side adapted to mate against an inclined surface on the seal retainer ring such that at installation of the retainer ring, the rectangular region of the seal is pressed firmly into a groove cavity in the valve body; and a T-shaped region on the inside diameter of the seal which is angled such that a neck region of the T-shaped region is normal to a sealing surface of the spherical disc, and in which the axial side surfaces of the neck region are cupped by contoured lips on the valve body and the retainer ring such that the seal cannot be extruded into a spring cavity defined by said groove and said retainer ring.

* * * * *